(12) United States Patent
Betti et al.

(10) Patent No.: US 9,845,730 B2
(45) Date of Patent: Dec. 19, 2017

(54) DEVICE AND METHOD FOR GAS TURBINE UNLOCKING

(71) Applicant: Nuovo Pignone Srl, Florence (IT)

(72) Inventors: Tommaso Betti, Florence (IT); Antonio Baldassarre, Florence (IT); Filippo Viti, Florence (IT); Stefano Meucci, Florence (IT); Marco Lazzeri, Florence (IT); Roberto Merlo, Florence (IT); Daniele Marcucci, Florence (IT)

(73) Assignee: Nuovo Pignone Srl, Florence (IT)

( * ) Notice: Subject to any disclaimer, the term of this patent is extended or adjusted under 35 U.S.C. 154(b) by 394 days.

(21) Appl. No.: 14/383,231

(22) PCT Filed: Mar. 6, 2013

(86) PCT No.: PCT/EP2013/054525
§ 371 (c)(1),
(2) Date: Sep. 5, 2014

(87) PCT Pub. No.: WO2013/131968
PCT Pub. Date: Sep. 12, 2013

(65) Prior Publication Data
US 2015/0040578 A1 Feb. 12, 2015

(30) Foreign Application Priority Data
Mar. 8, 2012 (IT) ................. FI2012A0046

(51) Int. Cl.
*F02C 7/04* (2006.01)
*F02C 7/26* (2006.01)
(Continued)

(52) U.S. Cl.
CPC .............. *F02C 7/18* (2013.01); *F01D 17/148* (2013.01); *F01D 19/02* (2013.01); *F01D 25/12* (2013.01);
(Continued)

(58) Field of Classification Search
CPC ...... F02C 7/26; F02C 7/04; F02C 7/57; F02C 7/27; F01D 19/02; F01D 17/146;
(Continued)

(56) References Cited

U.S. PATENT DOCUMENTS 3,903,691 A    9/1975   Szydlowski
4,003,200 A *   1/1977   Zerlauth ................. F01D 25/34
                                                                  60/39.091
(Continued)

FOREIGN PATENT DOCUMENTS

EP       1630356 A1    3/2006
EP       2180165 A2    4/2010
(Continued)

OTHER PUBLICATIONS

Search Report issued in connection with corresponding PCT application PCT/2013/054525 dated May 2, 2013.
(Continued)

*Primary Examiner* — Gerald L Sung
*Assistant Examiner* — Scott Walthour
(74) *Attorney, Agent, or Firm* — GE Global Patent Operation

(57) ABSTRACT

An aeroderivative gas turbine including an air intake plenum; a compressor with a compressor air intake in fluid communication with the air intake plenum; a combustor; a high pressure turbine; a power turbine. A forced air-stream generator is arranged in fluid communication with the air intake plenum. A shutter arrangement is provided in a combustion-air flow path, arranged and controlled to close the combustion-air flow path for pressurizing said air intake plenum by means of the forced air-stream generator to a pressure sufficient to cause pressurized air to flow through the aeroderivative air turbine.

24 Claims, 9 Drawing Sheets

(51) Int. Cl.

| | | |
|---|---|---|
| *F01D 19/02* | (2006.01) | |
| *F01D 17/14* | (2006.01) | |
| *F01D 25/12* | (2006.01) | |
| *F04D 25/14* | (2006.01) | |
| *F04D 29/66* | (2006.01) | |
| *F02C 7/18* | (2006.01) | |
| *F01D 25/34* | (2006.01) | |
| *F02C 7/27* | (2006.01) | |

(52) U.S. Cl.
CPC ............... *F01D 25/34* (2013.01); *F02C 7/04* (2013.01); *F02C 7/26* (2013.01); *F04D 25/14* (2013.01); *F04D 29/664* (2013.01); *F04D 29/665* (2013.01); *F02C 7/27* (2013.01); *F05D 2260/964* (2013.01)

(58) Field of Classification Search
CPC ........ F01D 17/148; F01D 25/12; F01D 25/34; F04D 25/14; F04D 29/664; F04D 29/665; F05D 2260/964
USPC .................................................. 415/175, 119
See application file for complete search history.

(56) References Cited

U.S. PATENT DOCUMENTS

| | | |
|---|---|---|
| 4,249,371 A | 2/1981 | Romeyke |
| 4,951,460 A | 8/1990 | Prochaska et al. |
| 5,323,604 A * | 6/1994 | Ekstedt ...................... F23R 3/34 60/747 |
| 5,501,427 A | 3/1996 | Ando |
| 5,671,597 A * | 9/1997 | Butler ...................... F23C 7/002 239/419 |
| 6,027,304 A | 2/2000 | Arar et al. |
| 6,082,094 A * | 7/2000 | Longardner .............. F02C 7/00 290/52 |
| 6,530,224 B1 | 3/2003 | Conchieri |
| 2003/0035714 A1 | 2/2003 | Kreitmeier |
| 2004/0211726 A1* | 10/2004 | Baig ...................... B01D 53/22 210/640 |
| 2006/0185761 A1 | 8/2006 | Kolberg |
| 2010/0263964 A1* | 10/2010 | Kosaka .................. F02C 7/045 181/214 |
| 2010/0293967 A1 | 11/2010 | Liskow et al. |

FOREIGN PATENT DOCUMENTS

| | | |
|---|---|---|
| JP | 4981909 A | 8/1974 |
| JP | 56068834 U | 6/1981 |
| JP | 61167434 U | 10/1986 |
| JP | 02118181 U | 9/1990 |
| JP | 06042368 A | 2/1994 |
| JP | 06241065 A | 8/1994 |
| JP | 07301343 A | 11/1995 |
| JP | 08338264 A | 12/1996 |
| JP | 2000045788 A | 2/2000 |
| JP | 2000097046 A | 4/2000 |
| JP | 2002349286 A | 12/2002 |
| JP | 2003097292 A | 4/2003 |
| JP | 2003206749 A | 7/2003 |
| JP | 2006206042 A | 8/2006 |
| JP | 2011506895 A | 3/2011 |
| RU | 2105177 C1 | 2/1998 |
| WO | 2011121355 A2 | 10/2011 |

OTHER PUBLICATIONS

Search Report issued in connection with corresponding IT application FI2012A000046 dated Nov. 8, 2012.

Arseniev et al., "Gas Turbine Units", Machine engineering, pp. 194, 1978.

Unofficial English Translation of Japanese Office Action issued in connection with corresponding JP Application No. 2014560357 dated Nov. 22, 2016.

Unofficial English Translation of Russian Office Action issued in connection with corresponding RU Application No. 2014134637 dated Dec. 20, 2016.

Unofficial English Translation of Japanese Search Report issued in connection with corresponding JP Application No. 2014560357 dated Dec. 21, 2016.

* cited by examiner

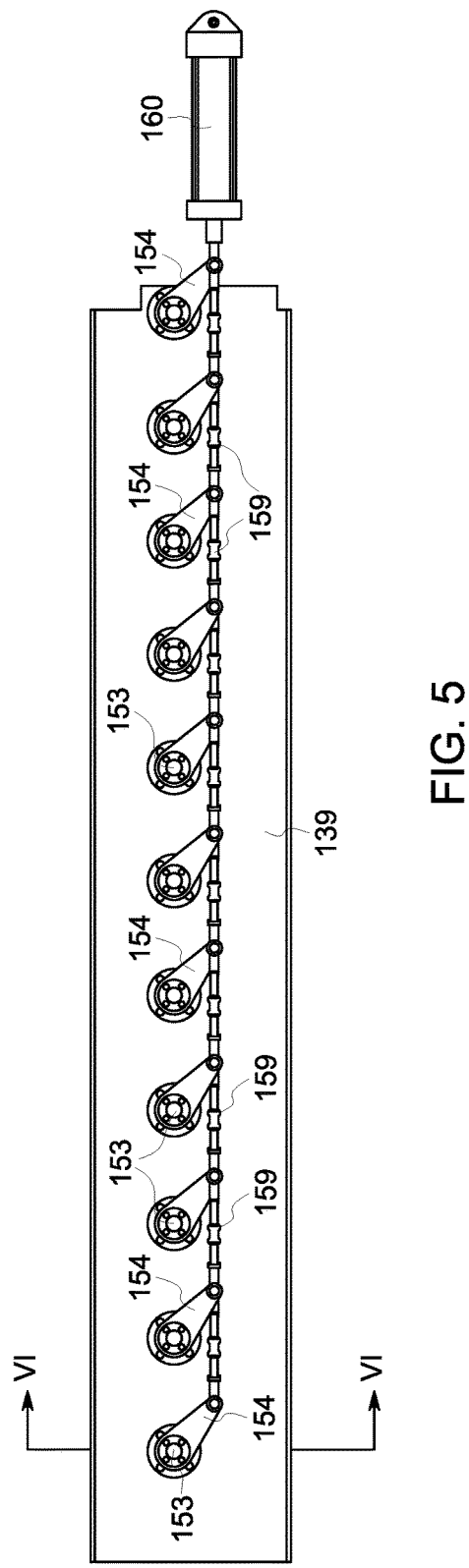

DEVICE AND METHOD FOR GAS TURBINE UNLOCKING

FIELD OF THE INVENTION

The present disclosure relates generally to gas turbines, particularly, to aeroderivative gas turbines. More specifically, the present disclosure relates to devices and methods for unlocking a gas turbine, following the shut-down and rotor locking due to temperature differentials inside the turbomachinery.

DESCRIPTION OF THE RELATED ART

Aeroderivative gas turbines are widely used as power sources for mechanical drive applications, as well as in power generation for industrial plants, pipelines, offshore platforms, LNG applications and the like.

The gas turbine can be subject to shut-down, e.g. in emergency situations, and re-started after a brief time period. When the rotor of the turbine is left motionless upon shut-down, thermal deformations may occur with the reduction or elimination of clearances between rotor and stator parts, hence leading to a rubbing between rotor and stator parts or a rising up to rotor locking phenomena. Thermal deformations are related to not uniform temperature fields, due to several factors. Cooling of the rotor when the turbine is motionless is non-uniform, the upper part of the rotor cools at a lower rate than the lower one, due to natural convectional phenomena, thus generating rotor bending and bowing deformations. Reduction of clearances between stator and rotor can also arise from temperature spreads related to the secondary flow distribution during shut-down. The turbine cannot be restarted until the rotor has reached the proper temperature field, as well as geometry. Under this respect, the most critical parts of the aeroderivative gas turbine are the blade tips in the compressor stages, where a limited clearance is provided between the stator and the rotor.

For some types of gas turbine-emergency shut-down the cool-down process requires significant amount of time, during which the turbine and the driven load can therefore not be re-started. This can cause substantial economic loss and/or create technical or management problems.

It has been suggested to solve this problem by keeping the turbine rotor revolving under a slow turning condition during the shut-down period, thus avoiding non-uniform cool-down of the rotor and preventing the latter from locking. This is usually done by driving the turbine rotor into rotation by means of the start-up electric motor. The start-up electric motor requires a large amount of electric energy to be powered. For some particular plant emergency shut-down conditions, no AC current is available, thus no start-up motor or any high energy consumption utility may be used.

SUMMARY OF THE INVENTION

To reduce the downtime required to cool down the gas turbine following shut-down and locking, a forced air-stream generator is provided which generates a stream of forced cooling air at a pressure sufficient to circulate the cooling air throughout the gas turbine when the latter is in a locked mode. The forced air stream reduces the time required to unlock the turbine rotor, so that the gas turbine can be re-started after a substantially shorter time interval than when no forced cooling air is provided.

U.S. Pat. No. 4,003,200 discloses a turbomachinery system wherein an auxiliary blower is connected to the air supply line. In this case, however, the blower is used to generate an air flow which is used to keep the rotor of the turbomachinery in a slow-rolling condition. This prior art arrangement does not address the problem of unlocking a gas turbine after shut-down, however.

According to one embodiment, an aeroderivative gas turbine is provided, comprised of an air intake plenum, a compressor with a compressor air intake in fluid communication with the air intake plenum, a combustion chamber, a high pressure turbine, and a power turbine. A forced airstream generator is advantageously arranged in fluid communication with the air intake plenum. Moreover, a shutter arrangement is provided in a combustion-air flow path through which air entering the gas turbine flows. The shutter arrangement is arranged and controlled to close the combustion-air flow path so that the air intake plenum is pressurized by means of the forced air-stream generator up to a pressure sufficient to cause pressurized air to flow through said aeroderivative turbine, while the latter is non-rotating, e.g. following locking after shut-down. The forced cooling air stream generated by the forced air-stream generator removes heat from the turbomachinery such that the effect of the thermal differential expansion which causes the locking of the rotor will be neutralized in a time shorter than with the absence of forced cooling.

In some embodiments, a silencer arrangement is provided in the combustion-air flow path. In this case, the shutter arrangement can be disposed downstream of the silencer arrangement with respect to an air stream in said combustion-air flow path.

The silencer arrangement may comprise a plurality of parallel arranged silencer panels, defining air passageways there between, each air passageway having an air outlet aperture. A pivoting shutter can be arranged at each air outlet aperture, to selectively open and close the air passageway. The pivoting shutters can be operated each by an independent actuator. In some embodiments, however, the shutters are connected to one another such as to be simultaneously controlled by a common opening and closing actuator.

Each pivoting shutter may be pivoting around a respective pivoting shaft. The pivoting shaft may be positioned so as to extend parallel to a respective silencer panel and downstream a trailing edge of said silencer panel. The trailing edge is the most downstream edge of the panel referring to the air flow direction.

In some embodiments, an inclined plate is arranged parallel to each pivoting shaft and extends in an air flow direction downstream each silencer panel. When the shutter is in the opened position, the inclined plate and the shutter can take a mutual position so that they converge to one another in the air flow direction and can be designed and arranged to form a low pressure drop profile extending downstream the respective silencer panel, whose cross section diminishes in the air flow direction.

According to some embodiments, each silencer panel has planar surfaces, opposing planar surfaces of each pair of adjacent silencer panels defining a respective air passageway. Each air passage can have a substantially rectangular cross section with a first dimension parallel to the planar surfaces of the silencer panels and a second dimension orthogonal to said planar surfaces. The first dimension is larger than the second dimension, e.g. ten times larger, i.e. the air passageways have a rectangular cross section with a long side and a short side, the short side being e.g. 10 times shorter than the long side, or smaller.

To achieve a better closure of the air intake plenum, and therefore a more efficient forced cooling of the gas turbine, at least some, and, in an embodiment, each, air outlet aperture is at least partly surrounded by a sealing gasket co-acting with the respective shutter. In some embodiments, each air outlet aperture is entirely surrounded by a sealing gasket. The sealing gasket may have a self-sealing shape. A self-sealing shape is one which increases the sealing effect when the air pressure in the air intake plenum increases.

For example, the sealing gasket may comprise a gasket body and a sealing lip projecting from the gasket body. The sealing lip may be arranged and designed to co-act with the respective shutter when the shutter is in a closed position, pressure in the air intake plenum forcing the sealing lip against the shutter.

Each air outlet aperture may be at least partly surrounded by a gasket retention profile, to anchor the sealing gasket and retain it in position.

In some embodiments an end-stop may be provided for each air outlet opening, said end-stop defining a closing position of the respective shutter, so that the pressure inside the air intake plenum will not squeeze the sealing gasket. This prevents mechanical damage to the sealing gasket.

In some embodiments the forced air-stream generator is designed and arranged to prevent air flow there through when said forced air-stream generator is inoperative. This could be advantageously achieved e.g. by using a positive displacement compressor, e.g. a rotary compressor, such as a Roots compressor, or a screw compressor or the like.

According to a further aspect, the present disclosure concerns a method for unlocking a rotor in an aeroderivative gas turbine following shut-down of said turbine, comprising the following steps: providing an air intake plenum in fluid communication with a combustion-air flow path, a compressor air intake of the aeroderivative gas turbine and a forced air-stream generator, providing a shutter arrangement, arranged and controlled to close the combustion-air flow path, cooling said rotor of the aeroderivative gas turbine when the rotor is locked following shut down, by closing the shutter arrangement and generating an overpressure in the air intake plenum by means of the forced air-stream generator, the overpressure being sufficient to force pressurized air through the locked rotor of the aeroderivative gas turbine.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 5 illustrates a side view according to line V-V in FIG. 3;

DETAILED DESCRIPTION OF EMBODIMENTS OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1A:
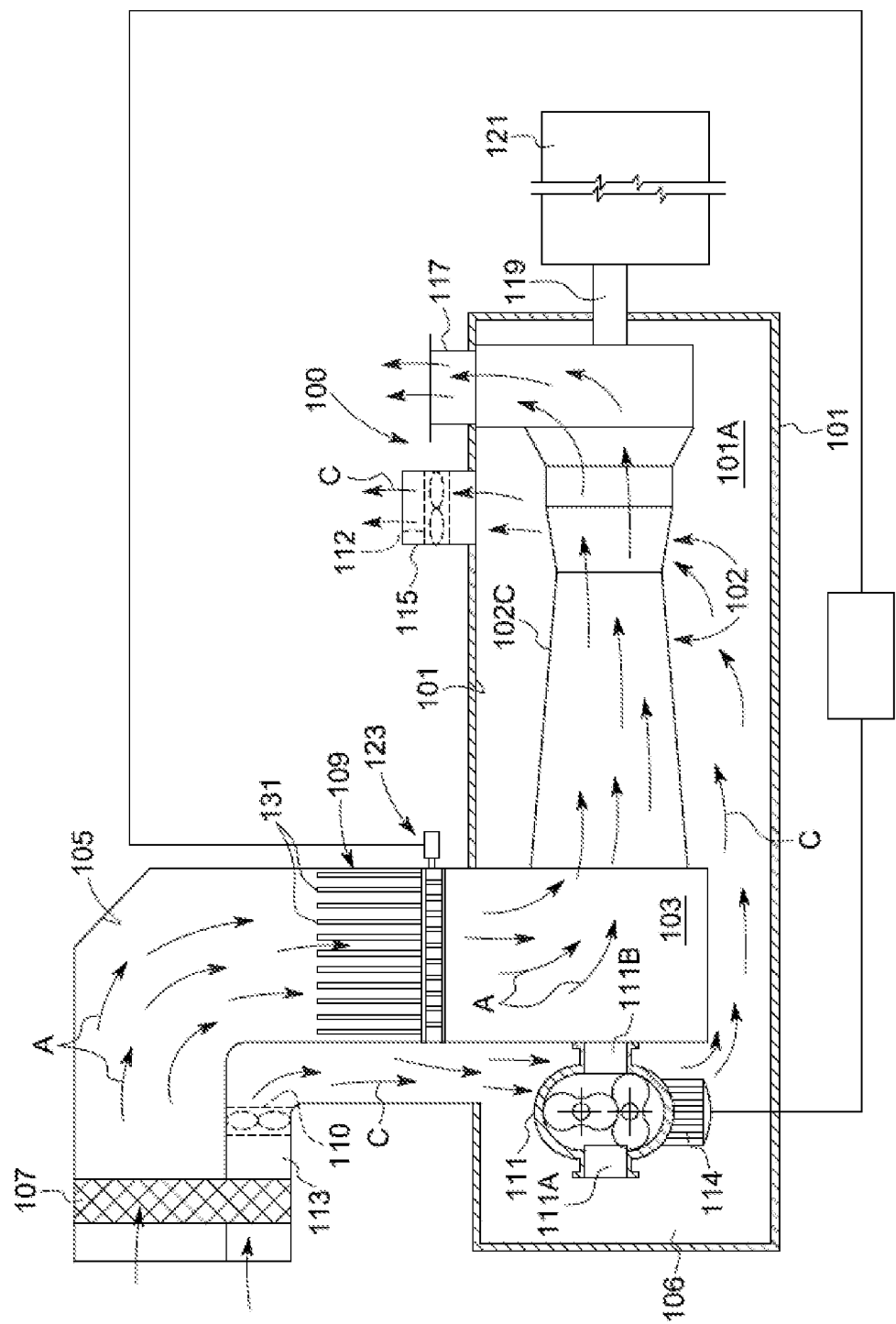
FIGS. 1A and 1B illustrate a schematic side view of an aeroderivative gas turbine package, comprising a forced-air system for turbine rotor unlocking, in two different operating conditions.
Figure 1B:
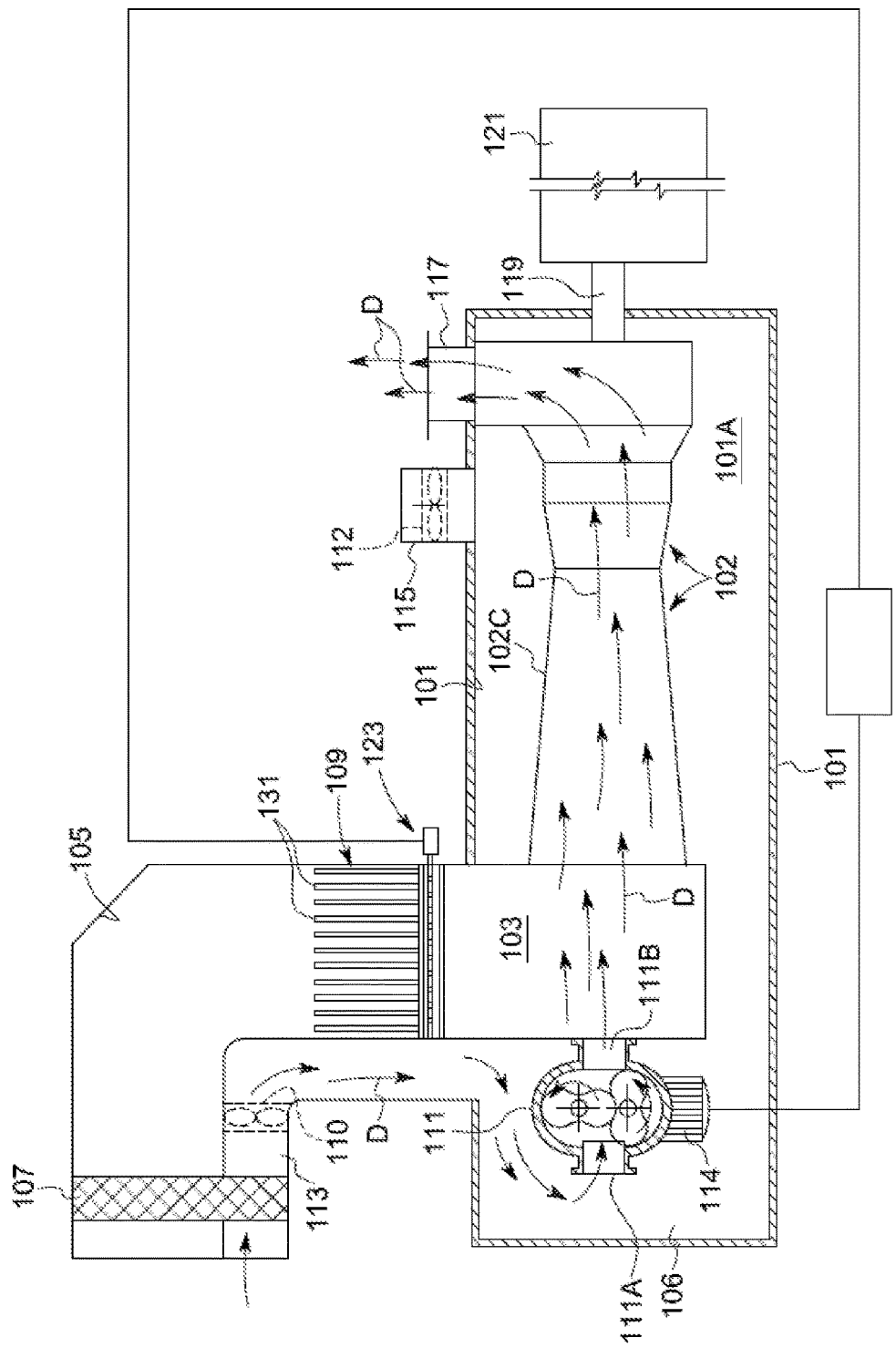

FIGS. 1A and 1B schematically illustrate a side view and a partial cross-section of an aeroderivative gas turbine installation. In FIG. 1A the gas turbine is in operation and in FIG. 1B the gas turbine is inoperative, while the unlocking arrangement is running.

The installation is labelled 100 as a whole. The installation comprises a package 101 and an aeroderivative gas turbine 102 arranged therein. Upstream of the aeroderivative gas turbine 102 an air intake plenum 103 is provided. The air intake plenum 103 is in fluid communication with a combustion-air flow path 105 extending above the air intake plenum 103. The inlet side of the combustion-air flow path 105 is provided with filters 107. Inside the combustion-air flow path 105 a silencer arrangement 109 is provided to reduce the noise generated by air intake.

As will be described in greater detail below with reference to FIG. 1A, the aeroderivative gas turbine 102 comprises a plurality of sections, including a compressor section, a combustor, a high pressure turbine and a power turbine. The aeroderivative gas turbine 102 further comprises an outer casing 102C enclosing the compressor and the turbines as well as the combustor. The casing 102C of the aeroderivative gas turbine 102 is surrounded by the package 101 which defines an inner volume 101A. Cooling air is circulated around the casing 102C and discharged through a discharging duct 115. Exhaust combustion gases discharged from the power turbine exit the package through an exhauster 117. In the diagrammatic representation of FIGS. 1A and 1B a driven shaft 119 is provided on the hot side of the aeroderivative gas turbine 102, to drive a generic load 121, for example an electric generator, a compressor or a compressor train of a natural gas liquefaction line, or any other suitable load.

In some embodiments, on the side of the air intake plenum 103 opposing the aeroderivative gas turbine 102, a compartment 106 is arranged which is in fluid communication with an air intake duct 113 and with the interior 101A of the turbine package 101. An air fan 110 can be arranged in the air intake duct 113. Alternatively, an air fan 112 may be arranged in the discharging duct 115. A combination of more fans is not excluded. The air fan(s) 110 and/or 112 generate a cooling air stream which enters the interior 101A of the gas turbine package 101 by flowing through the air intake duct 113 and the compartment 106 and around the air intake plenum 103 to cool the gas turbine casing 102C.

According to the embodiment illustrated in FIGS. 1A and 1B, a forced air-stream generator 111 is arranged in the compartment 106. In some embodiments the forced air-stream generator 111 comprises a positive displacement compressor, such as a rotary volumetric compressor. Suitable rotary compressors are rotary lobe compressors, such as Roots compressors, screw compressors or vane compressors. In more general terms, the forced air-stream generator 111 is comprised of a means to prevent air from flowing through the forced air-stream generator when the latter is not operating. If a positive displacement compressor is used, such as a Roots compressor, air flow through the compressor is prevented when the compressor is inoperable, without the need for an additional check valve arrangement, or the like. This makes the arrangement simpler and less expensive.

The forced air-stream generator 111 can be driven by a mover, such as an electric motor 114, for example. The inlet side of the forced air-stream generator 111 is shown in 111A and the outlet side is shown in 111B. The inlet side 111A is in fluid communication with the compartment 106, while the outlet side 111B is in fluid communication with the air intake plenum 103, so that when the forced air-stream generator is operating, air is sucked through the air intake duct 113 and flows forcedly through the air intake plenum 103 for the purposes which will be clarified after.

Figure 1C:
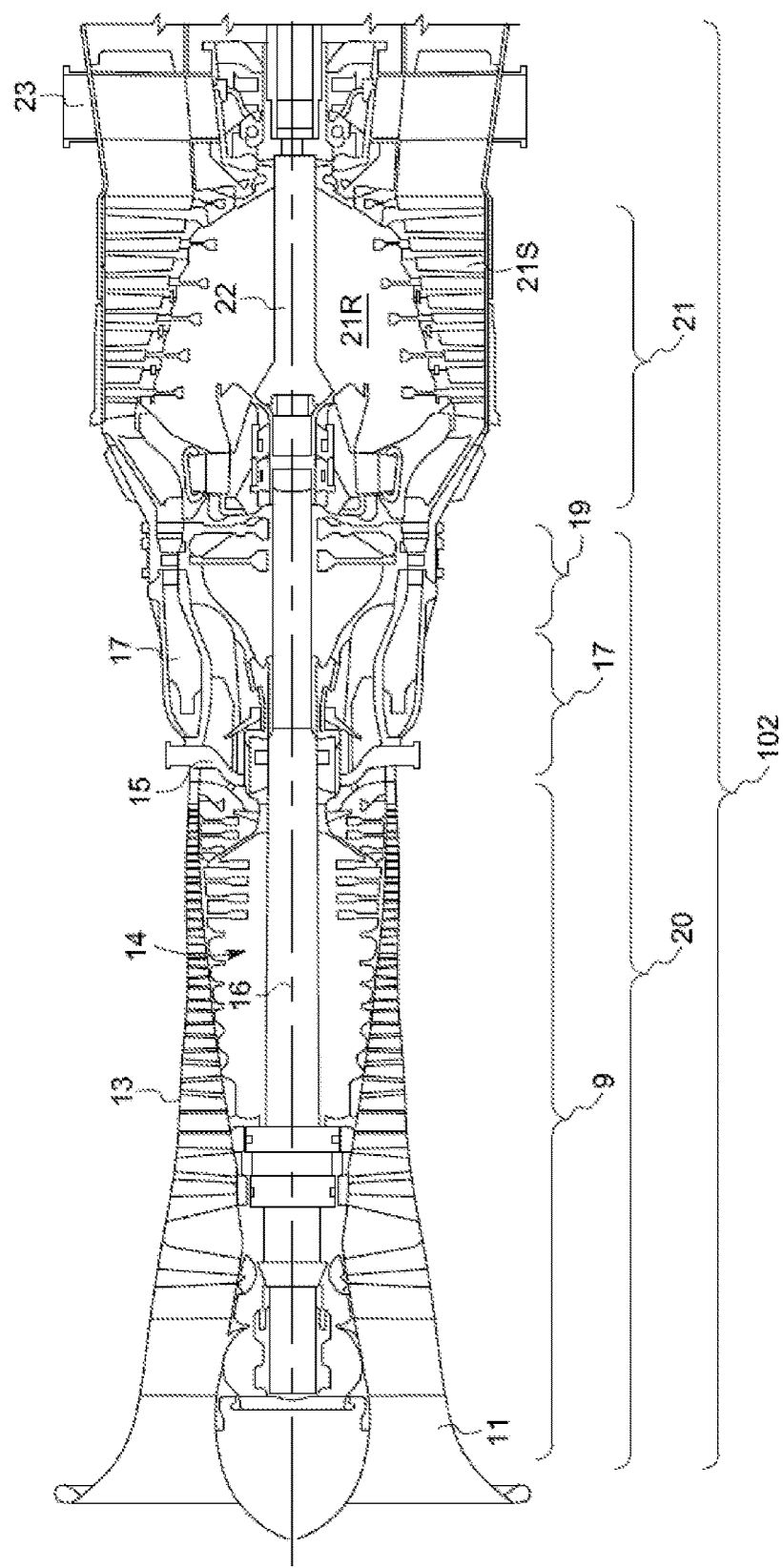
FIG. 1C illustrates a schematic longitudinal section of an exemplary embodiment of an aeroderivative gas turbine.
Figure 2:
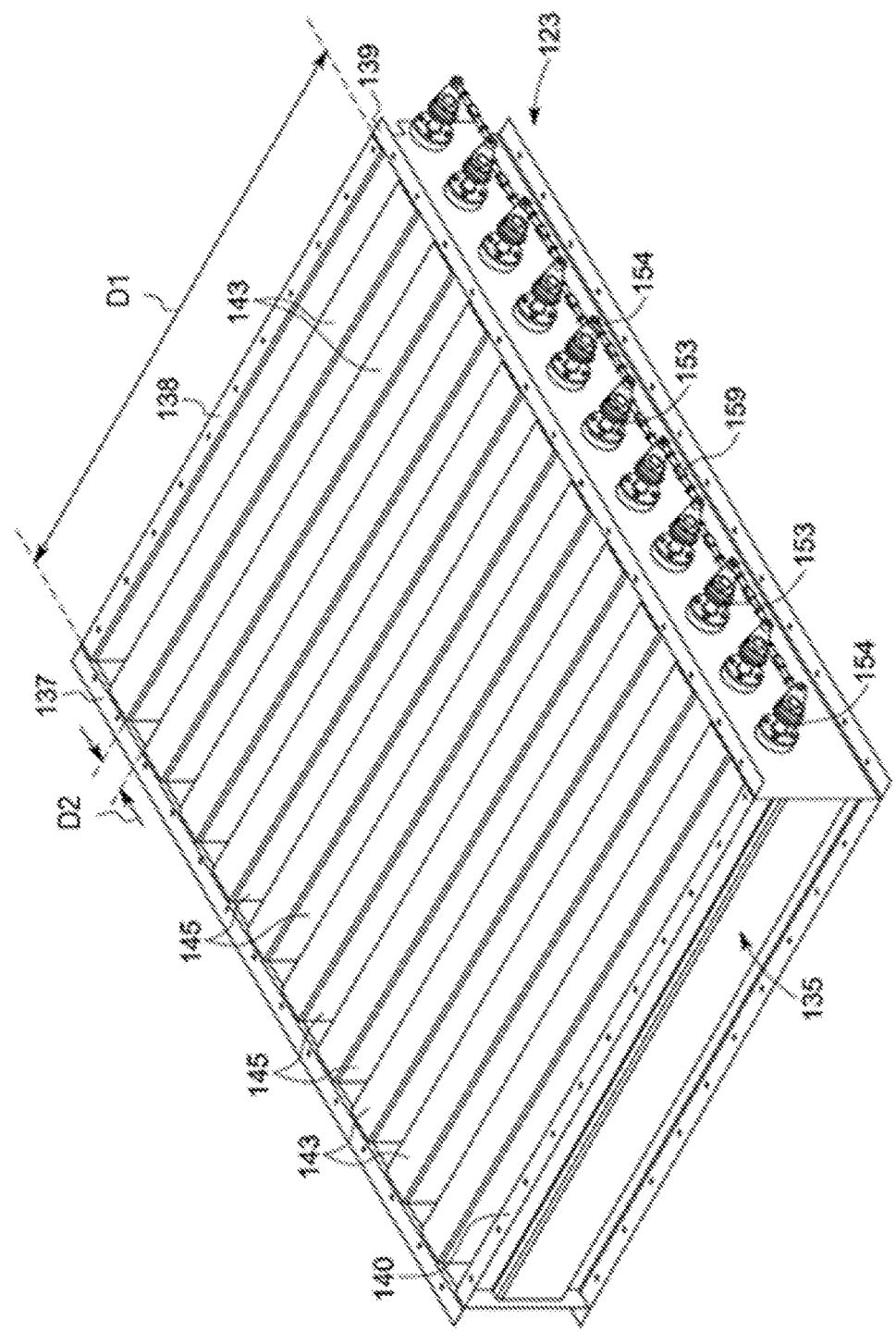
FIG. 2 illustrates an isometric view of a shutter arrangement of the forced-air system in one embodiment.
Figure 3:
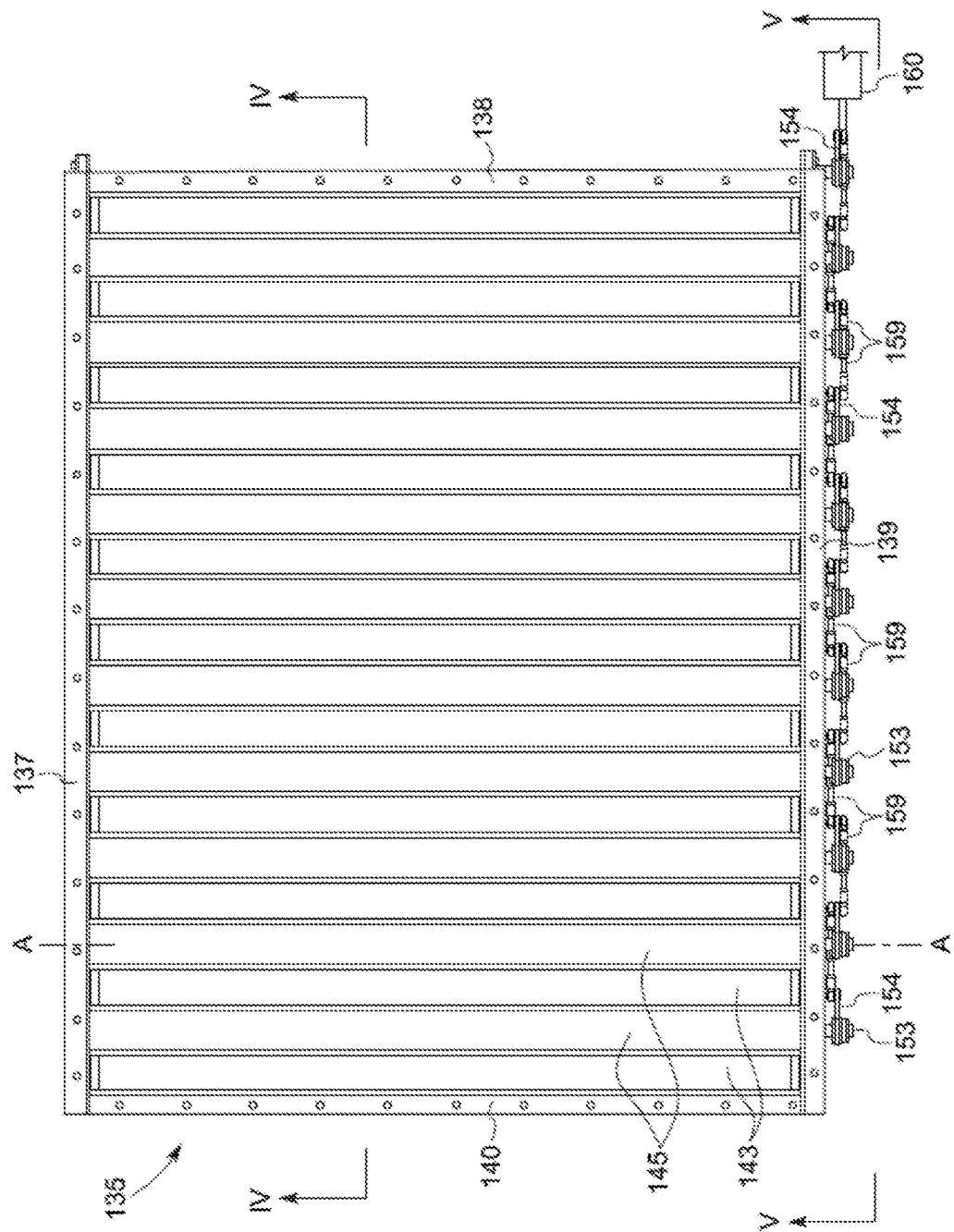
FIG. 3 illustrates a plan view of the shutter arrangement of FIG. 2.

Referring now to FIG. 1C, in some embodiments the aeroderivative gas turbine 102 comprises a compressor section 9, including a compressor front frame or bell mouth 11, forming a compressor air-intake, a casing 13 and a rotor 14 supported in a rotating manner by a shaft 16 and arranged in the casing 13. Rotary blades on the rotor 14 and stationary blades on the casing 13 cause air to be sucked through the bell mouth 11, compressed and fed to an outlet 15 of the compressor section 9. Outlet 15 is in fluid communication with a combustor 17. Compressed air exiting the compressor section 9 is fed into combustor 17, together with a gaseous or liquid fuel.

Combustor 17 is in fluid communication with a high pressure turbine 19. The high pressure turbine 19 is driven into rotation by the combustion gases flowing there through and provides power to drive the compressor section 9. Only part of the power available is used by the high pressure turbine 19 to drive the compressor. Hot gases exiting the high pressure turbine 19 are still pressurized and will be used in a downstream section of the aeroderivative gas turbine to generate mechanical power. The combination of compressor section 9, combustor 17 and high pressure turbine 19 is usually named gas generator and is designated 20 as a whole in the drawings.

In the embodiment illustrated in the drawings, the rotor 14 of the compressor section 9 and the rotor of the high pressure turbine 19 are supported by a common shaft 16 and jointly form a gas generator rotor.

The gas generated by the gas generator 20 and exiting the high pressure turbine 19 flows through a power turbine section downstream, wherein the energy contained in the gas is partly transformed into mechanical energy.

In the exemplary embodiment shown in the drawings, the power turbine section comprises a low pressure power turbine 21, which comprises a stator 21S and a rotor 21R. In the embodiment illustrated in the drawings, rotor 21R of the power turbine 21 is supported on and torsionally connected to a turbine shaft 22, which is mechanically separated from shaft 16 of the gas generator.

The power turbine 21 can include a variable number of expansion stages. The exemplary embodiment illustrated in FIG. 1A includes a low speed, six-stages power turbine. Other embodiments can include a high-speed power turbine, e.g. a high-speed, two-stages power turbine. Exhaust gases exiting the power turbine in 23 can be used for co-generation purposes, or simply discharged into the atmosphere.

The aeroderivative gas turbine illustrated in FIG. 1C is only an example. Various and different commercially available aeroderivative gas turbines can be used in this application. The overall structure and layout, including the number of compressors, the number of turbines, the number of shafts and the number of compression and expansion stages, may vary from one aeroderivative gas turbine to another. Suitable aeroderivative gas turbines are LM2500 Plus G4 HSPT or LM2500 Plus 6-Stage gas turbines: Both are commercially available from GE Aviation; Evendale, Ohio; USA. Other suitable aeroderivative gas turbines are the PGT25+ aeroderivative gas turbine; commercially available from GE Oil and Gas; Florence, Italy; or the Dresser-Rand Vectra® 40G4 aeroderivative gas turbine, commercially available from Dresser-Rand Company; Houston, Tex.; USA. In other embodiments, the aeroderivative gas turbine could be a PGT16, a PGT 20, or a PGT25; all commercially available from GE Oil and Gas; Florence, Italy. Also suitable is an LM6000 aeroderivative gas turbine; commercially available from GE Aviation; Evendale, Ohio; USA.

In some embodiments, the shaft of the aeroderivative gas turbine can drive the load 121 directly, i.e. with a direct mechanical connection, so that the load 121 rotates at substantially the same speed as the power turbine of the aeroderivative gas turbine 102. In other embodiments, a gearbox can be arranged between the shaft of the power turbine and the shaft of the load 121. The particular arrangement depends on design considerations, based on the kind of power turbine used (high speed or low speed) and/or on the rotary speed of load 121.

In the combustion-air flow path 105, downstream of the silencer arrangement 109, a shutter arrangement 123 is provided: The operation and structure whereof will be described in greater detail below. As will be described with greater detail below, the shutter arrangement 123 is closed and the forced air-stream generator 111 is started whenever, following shut-down of the aeroderivative gas turbine, the rotor of the aeroderivative gas turbine, and specifically the rotor of the gas generator, is locked and requires to be cooled down and unlocked to allow the aeroderivative gas turbine to restart.

Referring specifically to FIGS. 2 through 6, a first embodiment of the shutter arrangement 123 will now be described.

In advantageous embodiments, the shutter arrangement 123 is positioned underneath the silencer arrangement 109, as shown in FIG. 1, i.e. downstream of said silencer arrangement 109, with respect to the air-flow direction. The silencer arrangement 109 may include a plurality of parallel silencer panels 131. The silencer panels are, in an embodiment, flat or planar. Between each pair of adjacent silencer panels 131, a respective air passageway is formed. As will be clarified in the following description, the shutter arrangement 123 comprises a pivoting shutter for each air passage way, to provide an efficient closure of the combustion-air flow path 105, downstream of the silencer arrangement 109.

In the embodiment illustrated in FIGS. 2 through 6, the shutter arrangement 123 comprises a frame 135. In an embodiment, the frame 135 is comprised of side profiles 137, 138, 139 and 140, connected together to form a rectangular or square frame 135. In some embodiments, the outer dimension of the frame 135 matches the cross section of the combustion-air flow path 105.

In the exemplary embodiment illustrated in the drawings, a plurality of beams 143 is arranged inside of the frame 135. Each beam 143 spans across the width of the frame 135 from profile 137 to profile 139. The beams 143 are spaced one from the other to define an air passageway 145 between each pair of adjacent beams 143.

Figure 4:
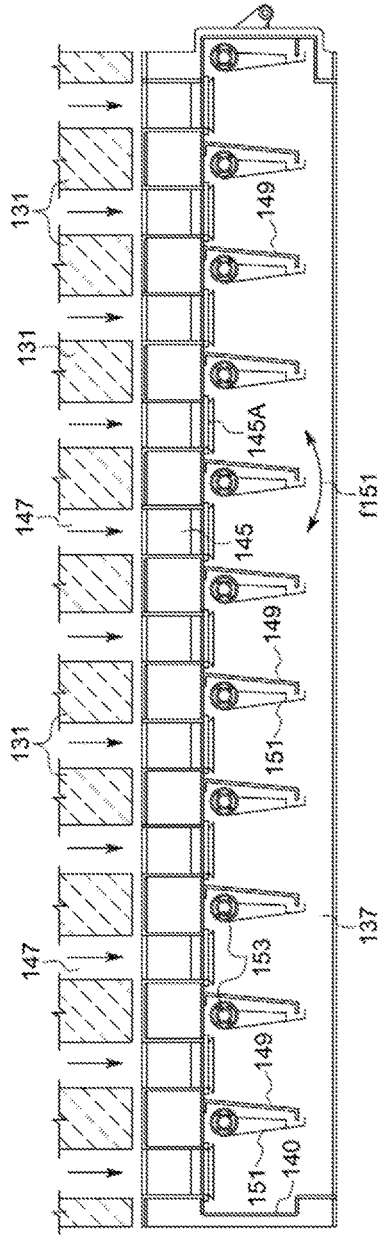
FIG. 4 illustrates a cross-section according to line IV-IV in FIG. 3.

As can be appreciated from the schematic representation of FIG. 4, each beam 143 is arranged underneath the lower edge of one of the silencer panels 131, which form the silencer arrangement 109. In some embodiments, the beams 143 have a square or rectangular cross-section. However, it should be understood that different cross-sections may be used.

The air passageways 145, defined between the adjacent and parallel beams 143, form an extension of corresponding passageways 147 defined between the corresponding parallel silencer panels 131. In this way, in the area of the silencer arrangement 109 and of the shutter arrangement 123, the interior of the combustion-air flow path 105 is divided into a plurality of side by side arranged air passageways 145, 147. Each passageway has a rectangular cross-section. More specifically, the cross-section of each air passageway 145, 147 has a first dimension D1 and a second dimension D2. The first dimension D1 corresponds to the width of the silencer panels 131 and to the length of the beams 143, while the second dimension D2 corresponds to the distance between adjacent beams 143. In some embodiments, the dimension D1 is several times larger than the dimension D2. In some embodiments, the dimension D1 is at least ten times greater than D2 or greater.

Figure 4A:
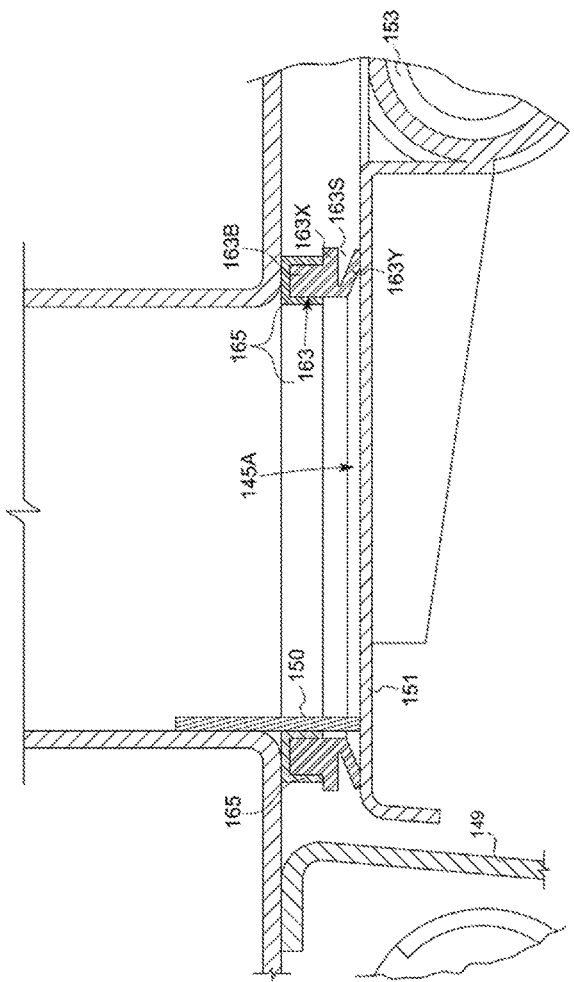
FIG. 4A illustrates an enlargement of detail A in FIG. 4 with the shutter arrangement in the closed position.
Figure 6:
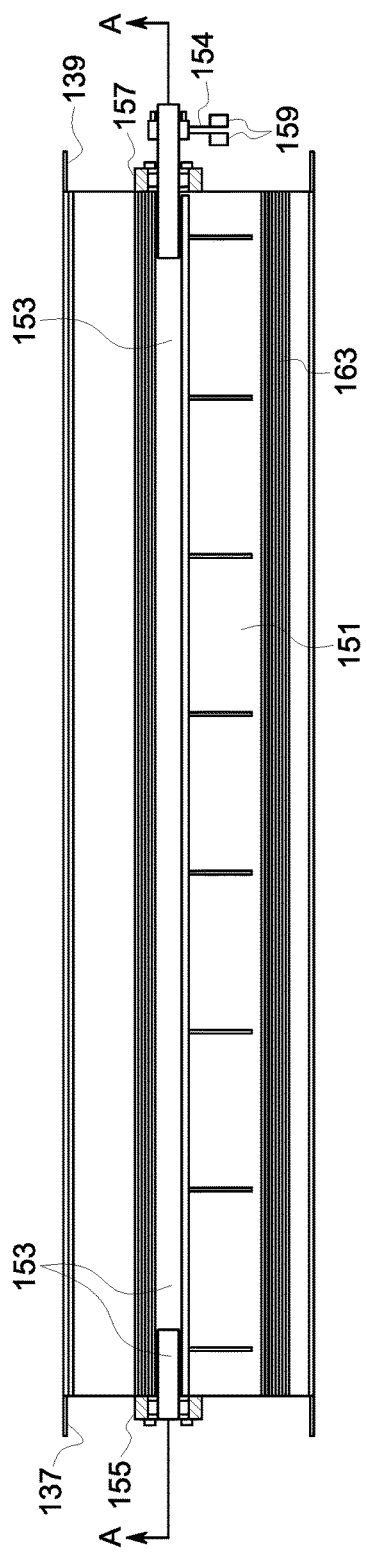
FIG. 6 illustrates a cross-section according to line VI-VI in FIG. 5.

Each air passageway 145, 147 has an air outlet aperture formed by the two respective parallel beams 143 and the two opposing profiles 137 and 139. The air inlet aperture, labelled 145A in FIGS. 4 and 4A, is surrounded by a sealing gasket, co-acting with a pivoting shutter, as will be further described below.

In some embodiments, from the lower sidewall of each beam 143 an inclined plate 149 extends towards the air intake plenum 103. Each inclined plate 149 develops along the entire length of the respective beam 143 and is arranged such as to converge in the downstream direction towards a vertical median plane of the corresponding beam 143, as well as the corresponding silencer panel 131.

In some embodiments, underneath each beam 143, i.e. downstream of each beam 143, with respect to the air flowing through the combustion-air flow path 105 towards the air intake plenum 103, a shutter 151 is pivotally supported by a corresponding pivoting shaft 153. Each pivoting shaft 153 (see in particular FIG. 6) is supported at both ends by supporting bearings 155 and 157. In the exemplary embodiment shown in FIG. 6, the bearing 155 of each pivoting shaft 153 is supported by the profile 137 and each bearing 157 is supported by the opposing profile 139. Each pivoting shaft 153 may therefore pivot around its axis A-A.

Each pivoting shaft 153 is provided with a lever 154 (see in particular FIG. 5). The levers 154 of pivoting shafts 153 are all connected, one to the other, by rods 159. The rods 159 form a sort of composite shaft extending from the first to the last of the various levers 154, so that by means of a single actuator (for example a cylinder-piston actuator schematically shown at 160 in FIG. 5) all the pivoting shafts 153 may be pivoted simultaneously around their own axis A-A, to obtain the simultaneous opening and closing of the shutters 151. The pivoting movement is a reciprocating rotary movement of around 90°.

In some embodiments, each shutter 151 is comprised of a flat panel which is torsionally constrained to the respective pivoting shaft 153, so that the reciprocating rotation of each pivoting shaft 153 causes a corresponding reciprocating rotation according to double arrow f151 of the respective shutter 151 (FIG. 4A).

By controlling the pivoting movement around the axis A-A of the respective pivoting shaft 153, each shutter 151 may be moved from an open position (FIG. 4) to a closed position (FIG. 4A) and vice-versa.

In the open position (FIG. 4) each shutter 151 is positioned underneath the respective beam 153. In some embodiments, each shutter 151 and the corresponding inclined plate 149 form a sort of trailing edge extending beyond the silencer panel 131 and the respective beam 143 in the direction of air flow towards the air intake plenum 103, when the shutters 151 are in the open position. This arrangement significantly reduces both the air flow pressure drop and noise.

By simultaneously rotating all the pivoting shafts 153 around the axes A-A thereof by means of the actuator 160, all of the shutters 151 are simultaneously brought into the closed position shown in FIG. 4A. In this position, each shutter 151 entirely closes the respective air inlet aperture 145A.

In some embodiments, each air inlet aperture 145A is surrounded by a sealing gasket 163. The air inlet aperture 145A has a narrow rectangular cross-section with dimensions D1-D2. The sealing gasket 163 is therefore correspondingly formed by rectilinear gasket portions extending around the rectilinear edges of the air inlet aperture 145A. The sealing gasket 163 can be formed by portions of an extruded profile, cut at 45° and glued or soldered together to take the shape of a narrow and elongated rectangular sealing gasket.

In some embodiments, the closed position of each shutter 151 is defined by an end-stop 150, which prevents the shutter from excessively squeezing or pinching the sealing gasket 163 when the shutter is in the closed position (FIG. 4A).

In some embodiments, the sealing gasket 153 is retained in its position by restraining it into a channelled profile 165, formed by a metal section of suitable cross section, as particularly shown in FIG. 4A. The channelled profile 165 extends around the entire air inlet aperture 145A and holds the sealing gasket 163 in place.

For a more efficient sealing effect, in some embodiments, the sealing gasket 163 comprises a gasket body 163B which is forcefully retained in the corresponding channelled profile 165, and further comprises a first lip 163X and a second lip 163Y. The two lips 163X and 163Y diverge, forming a wedged shaped space 163S. In the closed position (FIG. 4A) the shutter 151 is pressed against the lower lip 163Y. The sealing action of the lip 163Y against the upper surface of the shutter 151 is increased by the air pressure in the air intake plenum 103, due to the flexibility of the lip 163Y and the wedged shaped space 163S between the two lips 163X and 163Y. In this manner, efficient sealing is achieved even by applying a small torque to the pivoting shafts 153.

If the rotor of the gas generator of the aeroderivative gas turbine 102 becomes locked, following the turbine shut-down, e.g. due to rubbing of the compressor blades against the inside of the compressor casing, in order to reduce the downtime required to cool-down the rotor and unlock the gas turbine, the shutter arrangement 123 is closed and the forced air-stream generator 111 is started. Air is sucked through the air intake duct 113 and pressurized by the forced air-stream generator 111 in the air intake plenum 103 to such a value that air flows through the locked rotor of the aeroderivative gas turbine 102. In some embodiments an air pressure between 0.05 and 0.3 Bar and, in an embodiment, between 0.1 and 0.15 Bar above ambient pressure is desired within the air intake plenum 103. Under these pressure conditions an air flow through the aeroderivative gas turbine 102 is generated. The air flow cools the gas generator rotor, the turbine rotor and the casing down and is maintained until the rotor is unlocked. The cooling down and unlocking is achieved in a reduced time allowing the quick restarting of the aeroderivative gas turbine 102.

The special sealing gasket arrangement described above is particularly efficient in closing the combustion-air flow path 105 and avoiding backflow, from the air intake plenum 103 towards the environment, when the forced air-stream generator 111 is operative.

Figure 7:
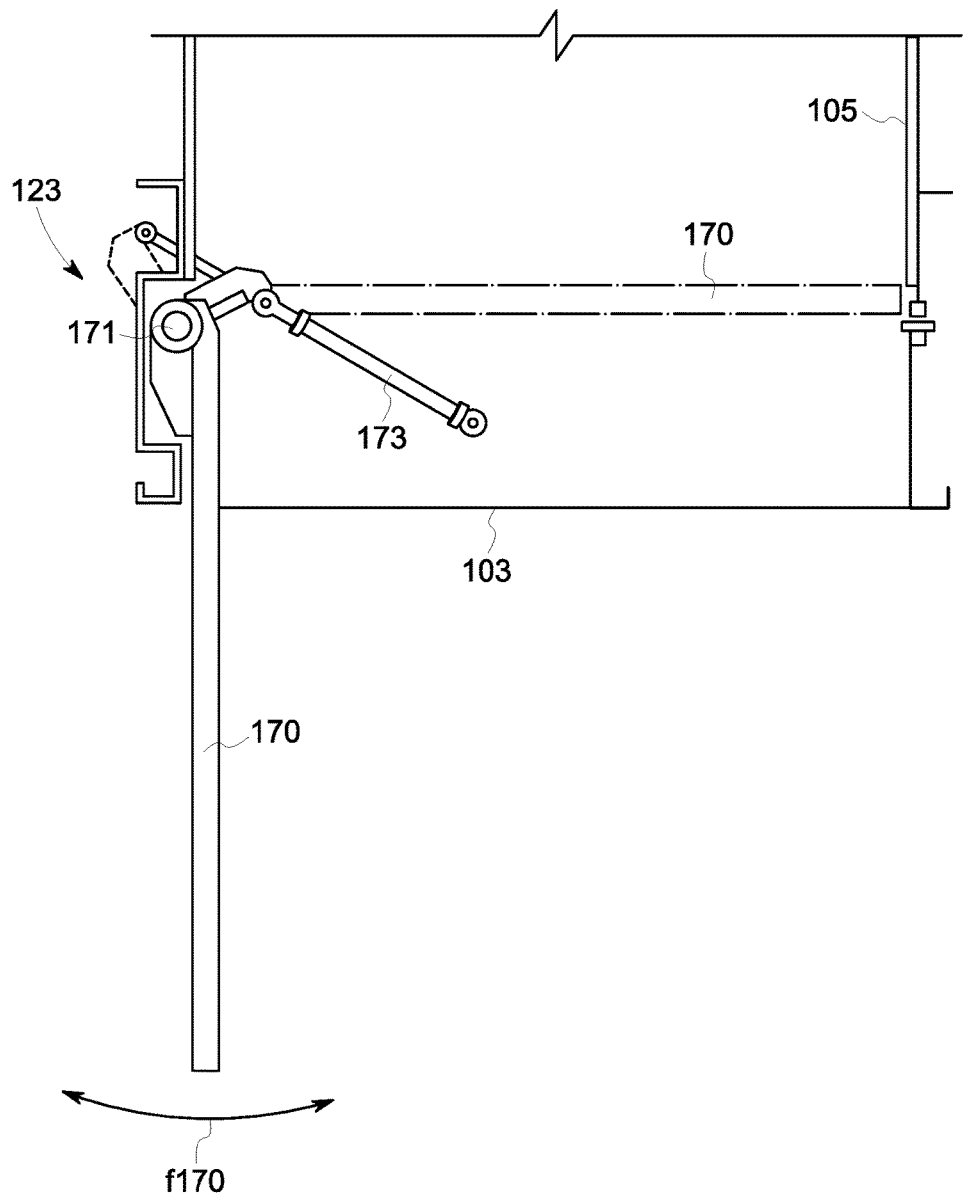
FIG. 7 illustrates a vertical cross section of the upper portion of an air intake plenum in a different embodiment.

FIG. 7 schematically illustrates a cross section along a vertical plane of an air intake plenum 103 provided with a different shutter arrangement. In this embodiment the shutter arrangement, again labelled 123 as a whole, comprises a single door or hatch 170 hinged at 171 to a side wall of the air intake plenum 103, such as to pivot around a horizontal axis, to selectively open or close the combustion-air flow path 105. A cylinder-piston actuator 173 controls the pivoting movement according to the double arrow f170 of the door or hatch 170, to move it from an open position (shown in solid lines in FIG. 7) to a closed position (shown in dotted lines in FIG. 7), in which the door 170 closes the combustion-air flow path 105 downstream of the silencer arrangement 109.

The operation of the gas turbine arrangement described so far, is the following. When the gas turbine is running (FIG. 1A), air flowing through the combustion-air flow path 105, the silencer arrangement 109 and the shutter arrangement 123 (arrows A in FIG. 1A) enters the air intake plenum 103 and the gas turbine 102. Combustion gases generated by the gas generator are expanded in the power turbine and discharged throughout the exhauster 117. Cooling air (arrow C) flows through the air intake duct 113, the interior 101A of the gas turbine package 101 and escapes trough the discharge duct 115. Air is prevented from flowing from the air intake plenum 103 through the forced air-stream generator 111 in the compartment 106 by the very nature of the device used, namely e.g. a positive displacement compressor.

If the gas turbine is shut down, already after a short time the gas generator rotor becomes locked due to rubbing. The gas turbine must be allowed to cool down until a sufficiently uniform temperature distribution (temperature field) is achieved, so that the gas generator rotor becomes free again to rotate.

To reduce the downtime required to restart the gas turbine, the forced air-stream generator 111 is used to generate a forced cooling air stream through the gas turbine. In order for the forced air-stream generator 111 to operate properly, the shutter arrangement 123 is closed to prevent air from the forced air-stream generator 111 from escaping through the combustion-air flow path 105.

The forced air-stream generator 111 is started by activating the motor 114. Air is thus sucked through the air intake duct 113 and delivered at a sufficient overpressure to the air intake plenum 103 and is caused to forcedly flow through the gas turbine and to exit from the exhauster 117, see arrows D in FIG. 1B The cooling air forcedly flows through the stationary (non-rotating) aeroderivative gas turbine 102, cooling the rotor and the casing of the aeroderivative gas turbine 102 and removing heat by forced convection. The rotor becomes unlocked in a much shorter time than required, if no forced cooling is provided. The time required to unlock the rotor can vary depending on the turbine design, or other factors. Tests performed on a PGT25+ gas turbine resulted in a total unlocking time of around 40 minutes. In general, the cooling time required using a forced air system as disclosed above ranges typically between 30 and 90 minutes. It should be understood that these numerical values are given by way of example and should not be construed as limiting the scope of the disclosure, since several parameters can influence the actual total time required to achieve the unlocking of the rotor.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A method for unlocking a rotor in an aeroderivative gas turbine following shut-down of the aeroderivative gas turbine, the method comprising:

providing an air intake plenum of the aeroderivative gas turbine, providing a compressor of the aeroderivative gas turbine, the compressor comprising a compressor air intake, providing a combustor of the aeroderivative gas turbine, providing a high pressure turbine of the aeroderivative gas turbine, providing a power turbine of the aeroderivative gas turbine, and providing a forced air-stream generator, wherein the air intake plenum is in fluid communication with a combustion-air flow path of the aeroderivative gas turbine, the compressor air intake, and the forced air-stream generator;

providing a shutter arrangement, arranged and controlled to selectively open and close the combustion-air flow path, wherein the shutter arrangement is provided in the combustion-air flow path through which air enters the air intake plenum;

providing a silencer arrangement, wherein the silencer arrangement comprises a plurality of parallel arranged silencer panels, the silencer arrangement defining a plurality of air passageways such that a respective air passageway is defined between respective pairs of adjacent parallel arranged silencer panels, each air passageway having an air outlet aperture, and a respective shutter provided by the shutter arrangement is movably arranged at each air outlet aperture to selectively open and close the respective air passageway; and cooling the rotor, when the rotor is locked following shut down of the aeroderivative gas turbine, by closing the shutters of the shutter arrangement and generating an overpressure in the air intake plenum using the forced air-stream generator, the overpressure being sufficient to force pressurized air through the locked rotor of the aeroderivative gas turbine.

2. The method according to claim 1, wherein the overpressure ranges between 0.05 and 0.3 Bar above ambient pressure.

3. The method according to claim 1, wherein the overpressure ranges between 0.1 and 0.15 Bar above ambient pressure.

4. An aeroderivative gas turbine comprising:
an air intake plenum;
a compressor comprising a compressor air intake in fluid communication with the air intake plenum;
a combustor;
a high pressure turbine;
a power turbine;
a forced air-stream generator arranged in fluid communication with the air intake plenum; and
a silencer arrangement;
wherein a shutter arrangement is provided in a combustion-air flow path through which air enters the air intake plenum, the shutter arrangement arranged and controlled to selectively open and close the combustion-air flow path to pressurize the air intake plenum by the forced air-stream generator, up to a pressure sufficient to force pressurized air through the aeroderivative gas turbine; and
wherein the silencer arrangement comprises a plurality of parallel arranged silencer panels, the silencer arrangement defining a plurality of air passageways such that a respective air passageway is defined between respective pairs of adjacent parallel arranged silencer panels, each air passageway having an air outlet aperture, and a respective shutter provided by the shutter arrangement is movably arranged at each air outlet aperture to selectively open and close the respective air passageway.

5. The aeroderivative gas turbine according to claim 4, wherein the shutter arrangement is disposed downstream of the silencer arrangement with respect to an air stream in the combustion-air flow path.

6. The aeroderivative gas turbine according to claim 4, wherein the shutters are pivoting shutters arranged to reciprocatingly pivot around respective axes to selectively open and close the air passageways.

7. The aeroderivative gas turbine according to claim 4, wherein the shutters are simultaneously controlled by an opening and closing actuator.

8. The aeroderivative gas turbine according to claim 6, wherein each pivoting shutter is arranged to pivot around a respective pivoting shaft extending parallel to a respective parallel arranged silencer panel and downstream from a trailing edge of the respective parallel arranged silencer panel.

9. The aeroderivative gas turbine according to claim 8, wherein a respective inclined plate is arranged parallel to each pivoting shaft and extends in an air flow direction downstream of each respective parallel arranged silencer panel, each inclined plate and a respective pivoting shutter converging to one another in the air flow direction and being arranged to form a trailing profile extending downstream of the respective parallel arranged silencer panel.

10. The aeroderivative gas turbine according to claim 4, wherein each parallel arranged silencer panel has planar surfaces, opposing planar surfaces of each pair of adjacent parallel arranged silencer panels defining the respective air passageways having a substantially rectangular cross section with a first dimension parallel to the planar surfaces and a second dimension orthogonal to the planar surfaces, the first dimension being larger than the second dimension.

11. The aeroderivative gas turbine according to claim 10, wherein the first dimension is at least ten times the second dimension.

12. The aeroderivative gas turbine according to claim 6, further comprising a beam arranged downstream of each parallel arranged silencer panel with respect to air flow in the combustion-air flow path, and wherein each pivoting shutter is pivoted downstream from the beam.

13. The aeroderivative gas turbine according to claim 9, wherein each inclined plate is supported by a respective beam and extends parallel thereto.

14. The aeroderivative gas turbine according to claim 4, wherein each air outlet aperture is at least partly surrounded by a sealing gasket co-acting with the respective shutter.

15. The aeroderivative gas turbine according to claim 14, wherein each air outlet aperture is entirely surrounded by the sealing gasket.

16. The aeroderivative gas turbine according to claim 14, wherein the sealing gasket has a self-sealing shape, such that a sealing action of the sealing gasket is increased by air pressure in the air intake plenum.

17. The aeroderivative gas turbine according to claim 14, wherein the sealing gasket comprises a gasket body and a sealing lip projecting from the gasket body, the sealing lip co-acting with the respective shutter when the respective shutter is in a closed position, wherein pressure in the air intake plenum presses the sealing lip against the respective shutter.

18. The aeroderivative gas turbine according to claim 14, wherein each air outlet aperture is at least partly surrounded by a gasket retention profile, the sealing gasket being anchored in the gasket retention profile.

19. The aeroderivative gas turbine according to claim 14, wherein an end stop is provided for each air outlet aperture, the end stop defining a closing position of the respective shutter.

20. The aeroderivative gas turbine according to claim 4, wherein the forced air-stream generator and the compressor air intake are arranged facing each other in the air intake plenum.

21. The aeroderivative gas turbine according to claim 20, wherein the forced air-stream generator is arranged inside a gas turbine compartment below a ventilation air entrance.

22. The aeroderivative gas turbine according to claim 4, wherein the forced air-stream generator is configured to prevent air flow through the forced air-stream generator when the forced air-stream generator is inoperative.

23. The aeroderivative gas turbine according to claim 22, wherein the forced air-stream generator comprises a positive displacement compressor.

24. The aeroderivative gas turbine according to claim 23, wherein the forced air-stream generator comprises a rotary compressor.

\* \* \* \* \*